UNITED STATES PATENT OFFICE.

FRANZ O. MATTHIESSEN, OF IRVINGTON, NEW YORK.

IMPROVEMENT IN PROCESSES FOR MANUFACTURING COFFEE-SUGAR.

Specification forming part of Letters Patent No. 201,809, dated March 26, 1878; application filed August 24, 1877.

*To all whom it may concern:*

Be it known that I, FRANZ O. MATTHIESSEN, of Irvington, New York, have invented an Improved Process for Manufacturing Coffee-Sugar, of which the following is a specification:

My improvement relates to the production of soft or coffee sugar, the particles of which are coated with sirup; and my process consists in manufacturing coffee-sugar by mixing with a magma made in the ordinary way in a vacuum-pan, but subjected to a prolonged boiling *in vacuo* until it contains, say, only about nine per cent. of moisture, a drier sugar or a dry powdered white sugar, or both, until the resulting product is made to contain only the quantity of moisture usually present in coffee-sugar.

It has heretofore been proposed to mix dry powdered sugar with sirup, for the purpose of producing a moist or coffee sugar; but it is difficult, if not impossible, to make such a mixture perfectly homogeneous. In my process I avoid this difficulty.

For mixing with the magma, I may use any refined white sugar, or a comparatively dry coffee-sugar, or both a white powdered sugar and a comparatively dry coffee-sugar, the essential condition of my process being merely that a given quantity of magma, containing, say, not more than nine per cent. of moisture, shall receive such an admixture of drier sugar that the resulting product will contain only the percentage of moisture which is usually present in coffee-sugar.

The mixing of the magma with the drier sugar is effected by ordinary and well-known mechanical means—as, for example, by stirring, sifting together, and pressing through rolls. It may be convenient, after mixing with the magma a certain proportion of perfectly dry powdered sugar, to hasten the conclusion of the operation by then adding a suitable quantity of a comparatively dry coffee-sugar.

The proportions of the different ingredients will, of course, be governed with reference to producing a final product containing only the desired percentage of moisture. For example, if perfectly dry sugar and a magma containing only nine per cent of moisture be mixed in equal proportions, the resulting product will contain four and one-half per cent. of moisture. Or, if a given quantity of magma containing nine per cent. of moisture be mixed with a like quantity, composed of two equal parts, one of dry sugar and the other of coffee-sugar containing two per cent. of moisture, the product will contain five per cent. of moisture.

I do not, therefore, base my claim upon any exact proportions of the ingredients employed; but

What I claim as my invention is—

The process of manufacturing coffee-sugar herein described, which consists in mechanically mixing with vacuum-pan magma a sufficient quantity of drier sugar to obtain a product containing the quantity of moisture usually present in coffee-sugar.

F. O. MATTHIESSEN.

Witnesses:
 FRED WEBER,
 J. JÜRGENSEN.